Figure 1:
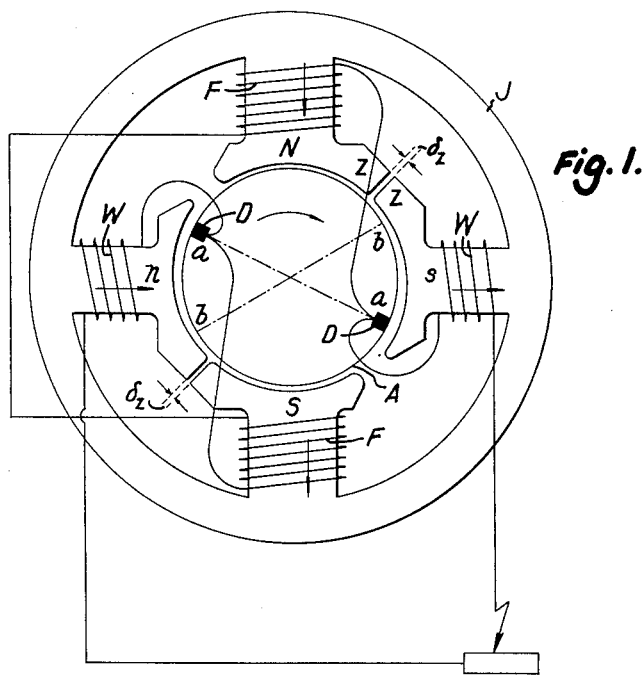

Inventor
Hermann Kocher
By Pierce, Scheffler & Parker
Attorneys

Patented July 25, 1950

2,516,220

UNITED STATES PATENT OFFICE 2,516,220

DIRECT-CURRENT GENERATOR

Hermann Kocher, Zurich, Switzerland, assignor to Aktiengesellschaft Brown, Boveri & Cie., Baden, Switzerland Application October 13, 1947, Serial No. 779,517
In Switzerland October 12, 1946

3 Claims. (Cl. 322—55)

(Granted under the provisions of sec. 14, act of March 2, 1927; 357 O. G. 5)

Direct-current generators which are used for welding purposes must satisfy the two following conditions:

(a) The generator must possess a good external or dynamic characteristic, that is, have good welding properties even with the lowest welding currents which are used.

(b) It must be possible to regulate the welding current continuously without having to alter any connections and without the use of series resistances which cause losses.

To enable a better understanding of the invention, the above term "dynamic characteristic" of a generator which is sometimes also referred to as the "external characteristic" is used by generator design engineers to denote its performance under sudden changes in output voltage or load current, i. e. how much the current increases when the voltage is suddenly reduced, for instance when a short circuit occurs, or how much the voltage increases when the current is suddenly reduced, for instance when the load current is suddenly removed. In both cases, the respective magnitudes of these values depend upon the rate-of-change of the excitation field which directly affects the EMF of the generator. Thus the quicker such field changes can be effected, the better is the "dynamic characteristic" and therefore the welding property of the generator.

In order to obtain the required dynamic characteristic it has already been proposed to provide leakage horns between the main poles and interpoles of the generator, or to extend the interpole shoe in the direction opposite to the direction of rotation of the generator, for instance by means of an auxiliary shoe, the brushes being kept fixed in the neutral zone, whilst the current is regulated by varying the compounding. This current regulation can for instance be achieved by means of a regulating resistor which is located in series with a cross-field winding connected to auxiliary brushes, or by displacing the auxiliary brushes. Generally, however, it is also necessary to provide a differential compound winding with the result that the main windings of such machines become rather complicated. The necessity of having to provide the generator with a regulating resistor and perhaps also auxiliary brushes increases the cost of the machine and has a determinal effect on its safety of operation, apart from the fact that the efficiency is reduced by the additional excitation losses.

The purpose of the present invention is to construct a direct-current generator with leakage horns arranged at one side between the main poles and interpoles, which satisfies the requirements of a good welding machine whilst at the same time avoids the drawbacks of the machines used hitherto. According to the invention this is achieved by extending the width of the interpole shoes on both sides of the neutral zone of the brushes beyond the extent required for commutation purposes and by making the air gap between the armature and the interpole shoe at the leading and trailing edges of the pole face different, so that when adjusting the machine for different welding currents by shifting the brushes, the required dynamic characteristic is obtained automatically.

Figure 2:
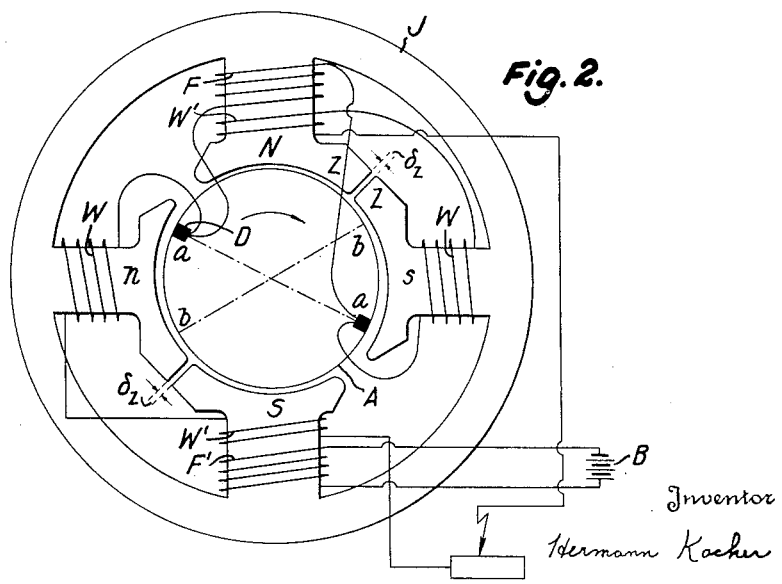

A constructional example of the invention is illustrated in the accompanying drawings where Fig. 1 shows a twin pole generator in schematic form and Figure 2 a modified embodiment.

Referring now to the drawings, the reference letter A designates the armature of the generator, J the magnet frame, N, S the main poles, and $n$, $s$ the interpoles of the machine. On each of the main poles N, S is an excitation winding F the two windings being arranged in series and connected across i. e. in shunt with the armature A so that their energization remains substantially constant independent of variations in the generator load current and W is the excitation winding arranged on each of the interpoles $n$, $s$, the two windings W being connected in series with the armature so that their energization varies in accordance with variations in the generator load current. The brushes are indicated by the reference letter D and the width of each interpole shoe is considerably extended on both sides of the neutral zone of the brushes, that is beyond the extent required for commutation so that each interpole shoe is wider than the shoe of the main pole. Two sets of leakage horns Z are provided between the main poles and the interpoles, each horn set being constituted by the trailing end of one of the main field poles and the juxtaposed leading end of the adjacent interpole.

The operation of the generator is as follows.

When the brushes are in the position $a$—$a$ shown in the drawing, the welding current supplied by the machine is at its minimum value, because a differential compound effect is produced by shifting the brushes in the direction of rotation of the machine and this effect considerably reduces the load current. Since the interpole shoes are made very wide, it is now possible to adjust the dynamic properties of the machine in a suitable manner even with the lowest welding current and this is of paramount importance. This is immediately realised when it is considered that the dynamic characteristic can only be achieved by means of a demagnetising winding which is not damped by any other windings; a series winding is most suitable for this purpose. For the brush position $a$—$a$ shown, this condition is fulfilled to a considerable extent by the interpole winding W, and the necessary demagnetising field, that is the dynamic characteristic, is adjusted by suitably selecting the size of the interpole shoe. If the minimum welding current thus obtained should be too small, this can be compensated by choosing a suitable strength of exciting current for the field winding F, and if necessary by arranging a small compounding winding $W^1$ on each of the main poles N, S, the two windings being connected in series with the armature as shown in Fig. 2 so as to receive an energization varying with the generator load current. In most cases, however, such a compound winding will be superfluous.

If the brushes are now shifted in a direction opposite to the direction of rotation of the machine, the differential compound effect of the interpoles $n$, $s$ decreases, that is the welding current increases. The dynamic effect also decreases, and this is not only allowable but also to a certain extent a desirable feature when welding with large currents. With the arrangement according to the invention it is thus possible to obtain the feature which it is desirable to have for welding machines, namely a dynamic characteristic which does not have the same inclination at different currents but becomes increasingly steeper as the welding current decreases.

When the brushes D are turned still further, the neutral zone is reached. In this position the interpoles have neither a cumulative nor differential compounding effect, either statically or dynamically. The welding properties of the machine would therefore no longer be good if the leakage horns Z were not present and made their effect fully felt. It is known that such leakage horns are only effective whilst changes in the welding currents occur, that is they only have a dynamic effect whilst from the static point of view their effect is negligible. The dynamic effect of the interpoles $n$, $s$ already described is thus added to the dynamic effect of the leakage horns Z. This is even the case when the brushes D are shifted beyond the neutral zone for instance up to the position $b$—$b$, so that statically the interpole winding W now produces a compounding effect and the welding current increases to the desired maximum value. Dynamically it is only necessary to take care that the leakage horn effect exceeds the direct compounding effect of the interpole and this can be achieved by suitably adjusting the leakage air gap $\delta/z$ between the confronting end faces of the main poles and interpoles.

According to a further feature of the invention the air gap between the interpole shoe and the armature is not uniform, but as shown in the drawing, is a minimum at the leading edge of the interpole face and increases steadily towards the trailing edge when referred to the direction of rotation of the machine. This arrangement has two advantages. On the one hand experience shows that normally dimensioned direct current generators which are subjected to heavy overloads, as is the case with welding machines, often have a tendency towards saturation phenomena in the commutation field circuit when overload currents occur. The commutating field thus becomes weaker as the current increases. With an interpole air gap of the aforementioned kind the commutating field strength will increase, however, with the current, so the saturation phenomena in the commutating field circuit will be eliminated. On the other hand with small currents (brush position $a$—$a$) a certain under-commutation such as occurs in this case is quite allowable. This under-commutation in a generator has, due to the short-circuit currents under the brushes, the same effect as a decoupled differential compound winding. In the case under consideration, on account of the size of the interpole shoe and the small reluctance under the interpole shoe, this effect is particularly pronounced in the low and medium welding current range and is thus very suitable for improving the dynamic properties of the machine still further.

Although the constructional example shown in the drawing is a two-pole generator, the invention is not restricted to this type machine and is equally applicable to generators with more than two main poles. Furthermore, the main poles can be all arranged in shunt with respect to the armature as illustrated in Fig. 1, or all separately excited, or some of the main poles can have separate excitation and the rest shunt excitation as illustrated in Fig. 2 wherein winding F on main pole N is connected in shunt to armature A, i. e. to the brushes D, while winding F" on the other main pole S is connected to an external source such as for example the illustrated battery B. When provided with separate excitation the field windings can be supplied over a rectifier connected to a stator winding of the alternating current motor which drives the generator. Since in many cases it is necessary for the welding terminals to have their polarity reversed, the separately excited field winding on the main poles can be provided with a change-over switch which is used for this purpose.

For regulating the current by means of brush displacement it is expedient to arrange a toothed segment on the brush rocker arm, this segment being manually operated by means of a pinion. A suitably calibrated welding current scale can be mounted on the handwheel for operating the pinion shaft so that the desired welding current can be easily obtained.

The generator according to the invention is very simple. Each main pole usually needs only one winding and no special regulating apparatus is required. Furthermore the efficiency is very good and this has a favourable effect on the size of the driving motor. The losses are small because there is no regulating resistor with corresponding losses and because particularly with large currents, which are of paramount importance as regards the motor, the production of the effective field is not restricted to the main poles but is also very considerably helped by the interpoles. This not only has a favourable effect on the excitation losses but also on the additional losses in the iron, which with machines of the usual kind assume considerable values when there are large overload currents.

I claim:

1. A direct current welding generator comprising armature and stator elements, at least one set of main field poles on said stator, said poles being provided with shoes and windings the energization of which remains substantially constant, interpoles on said stator intermediate said main poles, said interpoles each including a winding thereon arranged for energization in accordance with the generator load current, poles shoes on said interpoles and which extend in both directions from the interpole axis, adjustable brushes beneath said interpoles cooperative with the commutator element of said armature and through which the welding load current is taken, and a set of leakage horns between each of said main poles and interpoles, each said horn set being constituted by the trailing end of one of the main pole shoes and the leading end of the adjacent interpole shoe, said brushes when shifted from the neutral zone under said interpoles in a direction counter to the direction of rotation of said armature producing an increasing interpole cumulative compounding effect, and when shifted in the opposite direction from said neutral zone producing an increasing interpole differential compounding effect.

2. A direct current generator as defined in claim 1 wherein the gap between each interpole shoe and armature varies progressively in width, said gap being narrowest at the leading end of the shoe and widest at the trailing end thereof.

3. A direct current generator as defined in claim 1 and which further includes additional windings on said main field poles energized in accordance with the generator load current.

HERMANN KOCHER.

REFERENCES CITED

The following references are of record in the file of this patent:

UNITED STATES PATENTS

| Number | Name | Date |
|---|---|---|
| 1,237,272 | Arendt | Aug. 21, 1917 |
| 1,879,014 | Austin et al. | Sept. 27, 1932 |

FOREIGN PATENTS

| Number | Country | Date |
|---|---|---|
| 176,091 | Switzerland | June 17, 1935 |